United States Patent [19]
Anastasijevic et al.

[11] Patent Number: 5,637,206
[45] Date of Patent: Jun. 10, 1997

[54] PROCESS FOR THE ELECTROCHEMICAL PRODUCTION OF AMMONIUM POLYSULFIDE

[75] Inventors: Nikola Anastasijevic, Altenstadt; Eilhard Hillrichs, Budingen; Karl Lohrberg, Heusenstamm; Gert Ungar, Frankfurt am Main, all of Germany

[73] Assignee: Metallgesellschaft Aktiengesellschaft, Frankfurt am Main, Germany

[21] Appl. No.: 599,885

[22] Filed: Feb. 14, 1996

[30] Foreign Application Priority Data

Feb. 15, 1995 [DE] Germany .................. 195 04 920.9

[51] Int. Cl.⁶ .................. C23F 11/00; C02F 1/461
[52] U.S. Cl. .................. 205/494; 205/551; 205/554
[58] Field of Search .................. 205/551, 554, 205/494

[56] References Cited

U.S. PATENT DOCUMENTS 4,293,396  10/1981  Allen et al. .................. 204/106
4,765,873  8/1988   Chang et al. .................. 204/101

FOREIGN PATENT DOCUMENTS 0 226 415 A1  6/1987  European Pat. Off. .
43 06 445 C1  7/1994  Germany .
195 04 920 C1  7/1996  Germany .

OTHER PUBLICATIONS

Römpps Chemie–Lexikon, Franckh'sche Verlagschandlung, Stuttgart, pp. 3316–3317 (1987) (no month).

Primary Examiner—Arun S. Phasge
Attorney, Agent, or Firm—Sprung Horn Kramer & Woods

[57] ABSTRACT

The ammonium polysulfide is produced in at least one electrochemical cell, to which an aqueous ammonium sulfide solution is supplied as electrolyte. The cell comprises an anode, a gas diffusion cathode, and between the anode and the cathode an electrolyte chamber, where the cell voltage is 0.01 to 5V. The cathode has an electrically conductive, gas-permeable carbon layer, over which flows gas containing free oxygen, and which is in contact with the electrolyte. $O_2$-containing gas is introduced into the electrolyte chamber, thereby forming hydroperoxide anions ($OOH^-$) in the electrolyte chamber. From the electrolyte chamber a solution containing ammonium polysulfide and a residual gas are withdrawn.

7 Claims, 2 Drawing Sheets

1

PROCESS FOR THE ELECTROCHEMICAL PRODUCTION OF AMMONIUM POLYSULFIDE

BACKGROUND OF THE INVENTION

1. Field of the Invention

This invention relates to a process of producing ammonium polysulfide (APS) in at least one electrochemical cell, to which an aqueous ammonium sulfide solution is supplied as electrolyte, and from which an APS-containing solution is withdrawn.

2. Description of Related Art

Such process is known from EP-A-0 226 415 and from DE-C-43 06 445. The object underlying the invention is to create an inexpensive and at the same time efficient process which provides for an increased production of APS. In accordance with the invention, this is achieved in the above-stated process in that the cell comprises an anode, a gas diffusion cathode, and between the anode and the cathode an electrolyte chamber, the cell voltage being 0.01 to 5V, that the cathode has an electrically conductive, gas-permeable carbon layer, over which flows gas containing free oxygen, and which is in contact with the electrolyte, that gas containing free oxygen is introduced into the electrolyte chamber, where hydroperoxide anions ($OOH^-$) are formed in the electrolyte chamber, and that an APS-containing solution and a residual gas are withdrawn from the electrolyte chamber. The ammonium polysulfide has the chemical formula $(NH_4)_2S_x$, where x is in the range from 2 to 6. The pressure in the cell can be in the range from 0.1 to 20 bar, and in a special embodiment up to 60 bar. Such process is known from EP-A-O 226 415 and from DE-C 43 06 445.

In the process in accordance with the invention, the APS is produced in the electrochemical cell simultaneously in three different ways A, B, and C as follows:

SUMMARY OF THE INVENTION

Way A: By withdrawing negative charge, sulfide ions are oxidized at the anode to form elementary sulfur, which combines with ammonium sulfide to form APS:

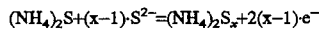

Way B: At the gas diffusion cathode, and in particular at the carbon layer thereof, chiefly the following two reactions take place with charge exchange:

Primary reaction: 

Secondary reaction: 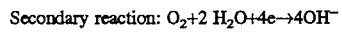

The primary reaction is advantageous in that the hydroperoxide anion ($OOH^-$) is formed. The secondary reaction with its mere formation of hydroxide is unfavorable. The formation of polysulfide, i.e. the necessary formation of elementary sulfur, is effected as follows:

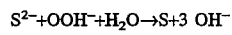

The elementary sulfur is known to form APS in an ammonium sulfide solution. For this type of polysulfide formation catalyst metals, e.g. noble metals, on the carbon layer of the gas diffusion cathode are unfavorable, as they intensify the above-stated secondary reaction. In the process of the invention, at least 10 wt-% and preferably at least 20 wt-% of the APS formed are produced through formation of hydroperoxide anions and their reaction with sulfide ions.

Way C: In this case, a chemical oxidation is effected through formation of activated oxygen, which is produced in the electrolysis cell in the electrical field. The following reaction takes place:

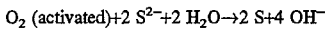

The activation of oxygen is effected in the electrolyte chamber preferably on the surfaces of the cathode and the anode, respectively, but there is no exchange of electrical charge. It is therefore important that gaseous oxygen is introduced into the electrolyte chamber. The scientific explanation for this activation of oxygen cannot be given here, but there is no doubt that the oxygen is not activated without the electrical field. To increase the contribution of the activated oxygen to the formation of APS, a higher pressure than 1 bar may be recommended in the cell. It is most advantageous that in the case of Type C no electricity is used. In the process in accordance with the invention at least 10 wt-%, and preferably at least 20 wt-% of the APS formed are produced by the gaseous oxygen which is introduced into the electrolyte chamber or chambers.

With the process in accordance with the invention it is possible to produce the APS at the same time both electrochemically and chemically. Formally spoken, there is achieved a current efficiency of more than 100%, and mostly of at least 150%. The current efficiency is calculated from the total charge of the elementary sulfur produced, with reference to the actual current consumption. In the case of a purely electrochemical APS production at an electrode, e.g. the anode, the current efficiency may not exceed 100

The carbon layer on the gas diffusion cathode may be formed in different ways. One possibility is that a layer of carbon fibers, e.g. a cloth of carbon fibers, constitutes said carbon layer. Such cloth made of carbon fibers is described for instance in the U.S. Pat. No. 4,293,396, where the fibers have in addition been coated with a mixture of particles of carbon and polytetrafluoroethylene (PTFE), so as to render them hydrophobic. The coating may also consist of a powder mixture of graphite and PTFE. The carbon layer may furthermore be constituted by a layer of carbon mouldings or carbon granules, e.g. in the form of a bed of carbon granules disposed between gas-permeable walls. Here as well, the above-mentioned hydrophobing of the surfaces of the granules by means of PTFE particles is recommended. It was found out that the coating of the carbon layer with a mixture of graphite-PTFE particles very much promotes the activation of the oxygen and the APS production thus achieved in Type C. In this way, current efficiencies of more than 150% can be achieved. It thus becomes possible that the amount of chemically produced APS in relation to electrochemically produced APS is at least 1:1.

The gas diffusion cathode includes an electrically conductive metal structure, where this metal structure is preferably formed of nickel or high-nickel alloys. The purpose of such structure is to achieve a homogeneous current distribution over the electrode surface. In general, the metal structure will be gas-permeable, and can for instance be a perforated sheet metal, expanded metal or a metal grid. The carbon layer is conductively connected with said metal structure. The anode generally consists of a sheet metal, but here as well a grid structure can be used. In addition to graphite, in particular corrosion-resistant nickel alloys (e.g. Hastelloy) are suitable as materials for the anode.

An aqueous ammonium sulfide solution is supplied to the electrolyte chamber, where the content of $(NH_4)_2S$ lies in the range from 0.1 to 200 g/l, and preferably is at least 10 g/l. The pH value of the electrolyte usually lies in the range from 7 to 12, and electrolyte temperatures of 20° to 50° C. are used in most cases. The electrolyte can additionally contain $NH_3$, cyanides and organic impurities, without disturbing the process.

BRIEF DESCRIPTION OF THE DRAWINGS

Embodiments of the process will now be explained with reference to the drawing, wherein.

DETAILED DESCRIPTION OF THE INVENTION

Figure 1:
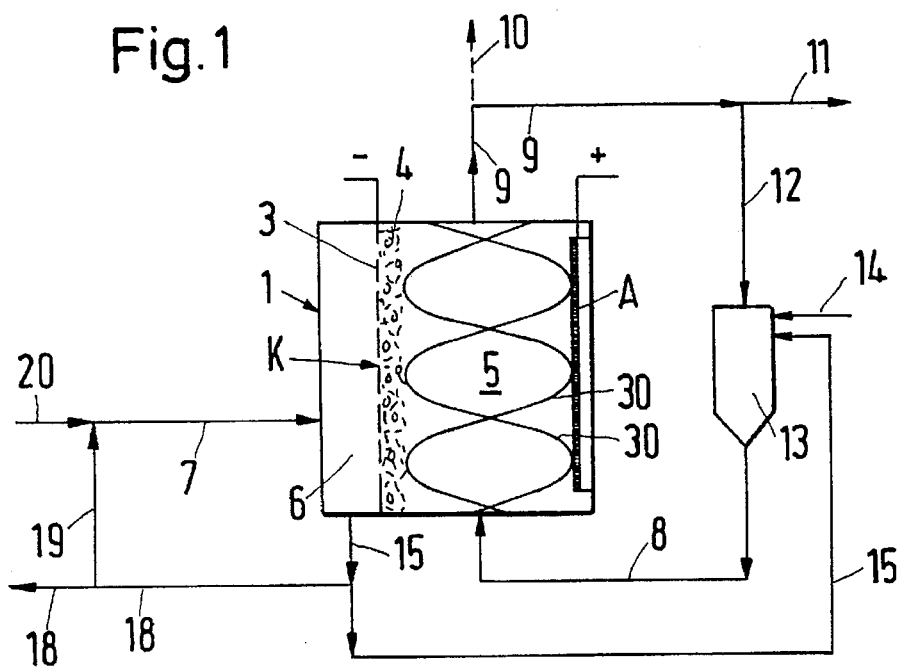
FIG. 1 shows an individual cell in a schematic representation.

The electrochemical cell of FIG. 1 comprises a container 1 of electrically nonconducting material, in which the anode A and the cathode K are arranged. The cathode includes a gas-permeable metal sheet 3, e.g. a metal net or expanded metal, with which a carbon layer 4 is connected. In FIG. 1 it is assumed that the carbon layer 4 is a carbon cloth, which is coated with a mixture of graphite and PTFE particles. Between the cathode K and the anode A an electrolyte chamber 5 is disposed, and the container 1 furthermore comprises a gas distribution chamber 6. Oxygen-containing gas, e.g. air, oxygen-enriched air or technically pure oxygen, is supplied to the gas distribution chamber 6 through line 7.

To fix the distance between the cathode K and the anode A, it may be expedient to provide a supporting framework 30 of electrically nonconducting material, e.g. polypropylen, in the electrolyte chamber 5. The supporting framework provides for a largely unimpeded circulation of liquid and gas in the chamber 5.

The electrolyte, an aqueous ammonium sulfide solution, is supplied to the electrolyte chamber 5 through line 8, and APS-containing solution is withdrawn via line 9. In the gas distribution chamber 6 a minor overpressure is produced, so that the gas can penetrate through the cathode K and enter the electrolyte chamber. In the chamber 5, the gas, which still contains molecular oxygen, is bubbling upwards and will be withdrawn together with the liquid via line 9. In line 9, the gas separates from the liquid and is withdrawn via line 10 indicated in phantom lines. This gas, which is also referred to as residual gas, usually contains $NH_3$ and $H_2S$ in addition to residual oxygen.

The liquid in line 9 is enriched with ammonium polysulfide, and a partial stream thereof is withdrawn as product via line 11. The remaining solution is supplied via line 12 to a collecting container 13, to which there is also added fresh ammonium sulfide solution via line 14. From the container 13, solution rich in ammonium sulfide is returned to the electrolyte chamber 5 via line 8.

Since the cathode K is gas-permeable, it must be expected that electrolyte is leaking from chamber 5 through cathode K into the gas distribution chamber 6. To keep the liquid level in the chamber 6 low, a drain line 15 is provided for recirculating the liquid back to the collecting container 13. Through the drain line 15 there is inevitably also withdrawn a certain part of the oxygen-containing gas of the chamber 6, where this gas is separated in line 18, and some of it is recirculated back to line 7 via line 19. Fresh, oxygen-containing gas is coming from line 20.

In the individual cell represented in FIG. 1, a cell voltage between cathode K and anode A of 0.1 to 5V is provided. The current density in the electrolyte chamber 5 usually lies in the range from 10 to 1000 $A/m^2$, and in practice, the distance between the carbon layer 4 and the anode A mostly lies in the range from 3 to 20 mm. The carbon layer 4 can have a thickness in the range from 0.4 to 20 mm.

Figure 2:
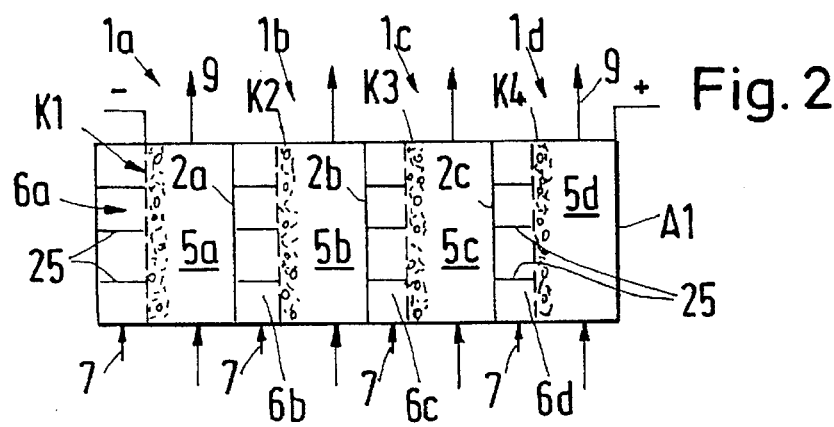
FIG. 2 shows a plurality of cells including series-connected electrodes.

FIG. 2 shows four series-connected cells 1a, 1b, 1c and 1d including a terminal cathode K1 and a terminal anode A1. The gas distribution chambers 6a, 6b, 6c and 6d are each supplied with gas containing free oxygen via lines 7.

Between adjacent cells liquid-tight metal plates 2a, 2b and 2c are arranged, which on the one hand constitute a partition between adjacent cells, and on the other hand serve as anodes for the directly adjoining electrolyte chamber 5a, 5b or 5c. A cathode side K2, K3 or K4 is conductingly connected with each metal plate, the electrically conducting connection being formed by individual metal supports 25. Said metal supports extend through the respective gas distribution chamber 6a, 6b, 6c and 6d associated with the respective cell. Each electrolyte chamber 5a, 5b, 5c or 5d may be provided with a supporting framework 30, as is represented in FIG. 1. Residual gases and APS-containing liquid leave the respective electrolyte chamber through line 9.

In the cells of FIG. 2 one metal plate 2a, 2b or 2c together with the associated cathode side K2, K3 or K4 each constitute a bipolar electrode, whose potential lies between the potentials of the terminal anode A1 and the terminal cathode K1. In this case, the voltage differences are formed on the one hand by the voltage existing between the terminal anode A1 and the terminal cathode K1, and on the other hand by the ohmic resistance of the electrolyte in the electrolyte chambers. As can be seen, the cell arrangement of FIG. 2 only needs two connections with the voltage source, so that there is achieved a structurally simple design.

Figure 3:
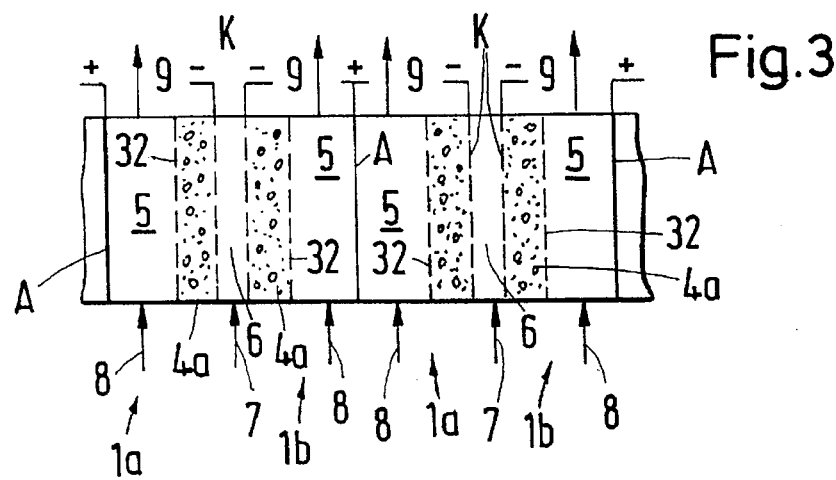
FIG. 3 shows a plurality of cells electrically connected in parallel.

In the cell arrangement of FIG. 3 two cells 1a and 1b are arranged laterally reversed with respect to each other, so that they can be supplied with $O_2$-containing gas from a common gas distribution chamber 6. The anodes A have the same potential, and the cathodes K are likewise connected in parallel. The carbon layers 4a are formed by carbon granules, whose surfaces have been made hydrophobic by means of PTFE particles. The granules are disposed as a bed between two gas-permeable walls. One of these walls is formed by the cathode made of perforated sheet metal, and the other wall 32 is a sieve plate, which preferably consists of an electrically nonconducting material. Thus, the oxygen-containing gas can easily flow from the respective distribution chamber 6 through the cathode, the bed of granules 4a and the sieve plate 32 into the nearest electrolyte chamber 5 and then upwards in the electrical field. Electrolyte is supplied through lines 8, and APS-containing liquid together with residual gas are withdrawn through lines 9.

Just as in FIG. 2, a drain line 15 (see FIG. 1) was also omitted in FIG. 3 for the sake of clarity. If necessary, such drain lines at the bottom of the gas distribution chambers may also be provided in the cells in accordance with FIG. 2 and FIG. 3. It is also possible to provide a supporting framework 30 in the electrolyte chambers of the cells shown in FIG. 2 or FIG. 3, as this was explained in conjunction with FIG. 1.

Figure 4:
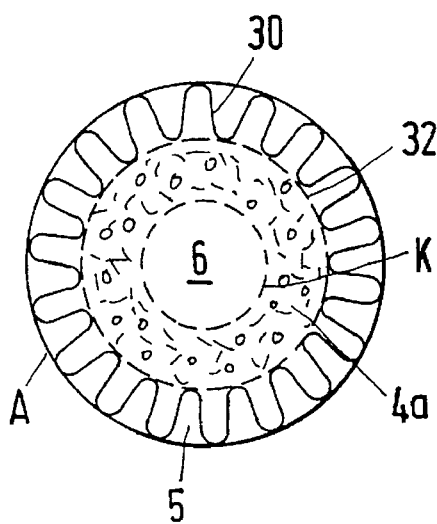
FIG. 4 shows a cross-section of a cell including cylindrical electrodes.

A cylindrical cell with concentric electrodes is represented in cross-section in FIG. 4. The gas distribution chamber 6 is provided in the center, surrounded by the cathode K with a carbon layer in the form of a bed of granules 4a and a perforated, cylindrical supporting wall 32. The electrolyte chamber 5 is designed as an annular chamber, which is surrounded by the cylindrical anode A. The electrolyte chamber 5 is provided with a supporting framework 30 to improve the stability of the cell.

In the embodiment in accordance with FIG. 5 three cells 1a, 1b and 1c are disposed one below the other, where analogous to FIG. 2 bipolar electrodes are being used. From a not represented external voltage source a direct voltage is applied to the terminal anode A1 and the terminal cathode K1. Due to the ohmic resistances of the electrolyte, the liquid-tight separating plates 35 and 36 have intermediate potentials. The separating plates 35 and 36 made of metal, e.g. a corrosion-resistant nickel alloy, each represent a gas- and liquid-tight partition for the cell disposed thereunder. With each partition 35 and 36 cathode plates 3a, 3b or 3c are connected by means of electrically conducting webs 25. Below the cathode plates, which are made of perforated metal, there is each disposed a bed 4a of carbon granules, where the lower surface of the respective bed is formed by a perforated tray 32. Between the tray 32 and the underlying wall A1, 35 or 36, the electrolyte chamber 5 is disposed, which is supplied with oxygen-containing gas from the associated gas distribution chamber 6a, 6b or 6c. Residual gas is withdrawn through line 9a.

Figure 5:
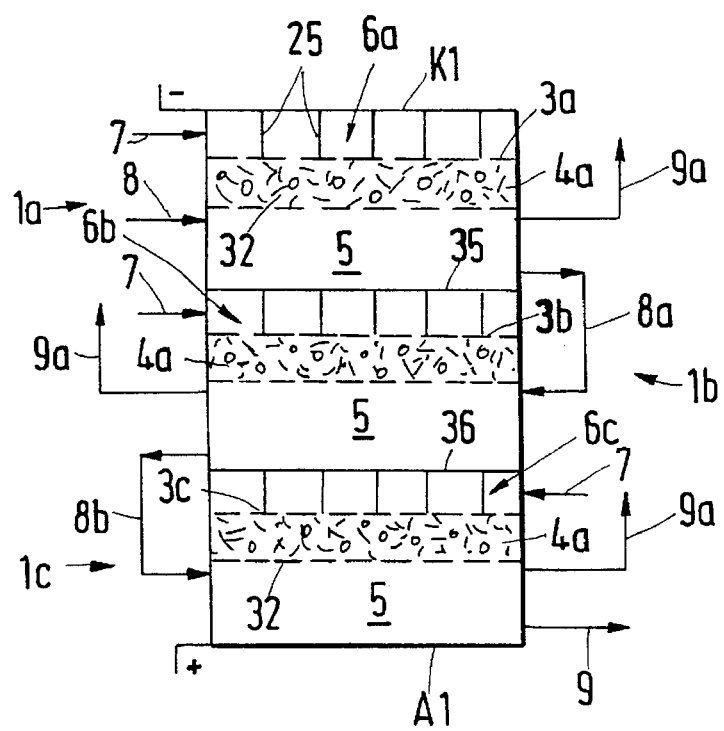
FIG. 5 shows a plurality of cells disposed one above the other including series-connected electrodes.

In FIG. 5 the cells 1a, 1b and 1c are connected in series with respect to the electrolyte flow, where the electrolyte is supplied through line 8 to the uppermost cell and its electrolyte chamber 5, the electrolyte is withdrawn through line 8a and introduced into the underlying cell 1b, and the electrolyte is finally supplied through line 8b to the lowermost cell 1c. The APS-containing solution is withdrawn via line 9.

Figure 6:
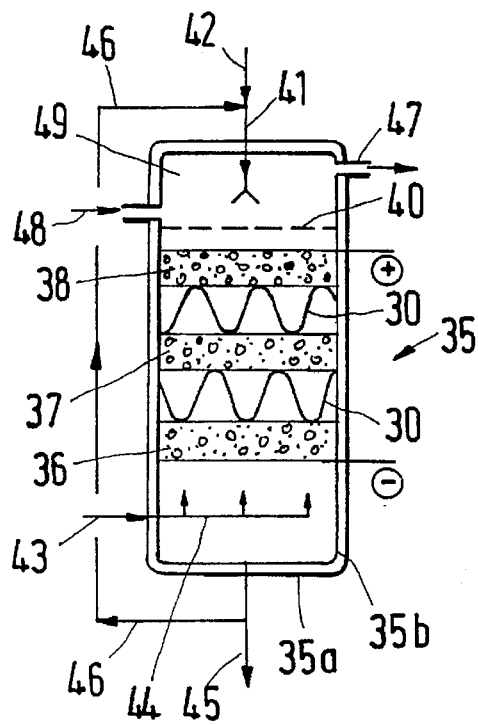
FIG. 6 shows a bipolar electrical arrangement in a column.

FIG. 6 shows a column 35 comprising an outer metal shell 35a, e.g. made of steel, and an inner side 35b of electrically nonconducting material, e.g. plastics. In the column, a plurality of packing layers 36, 37 and 38 are arranged one above the other, which are each formed of graphite elements and are therefore electrically conductive. The layers are gas- and liquid-permeable, the graphite elements can have been made hydrophobic in the manner described above by coating them with PTFE particles. The packing layers can also be replaced by perforated graphite plates or graphite-containing grids.

The uppermost packing layer 38 constitutes the terminal anode, and the lowermost packing layer 36 constitutes the terminal cathode of an electrochemical arrangement including series-connected cells. The number of individual cells disposed therebetween, given by bipolar electrodes, can be chosen at will. In FIG. 6 the packing layer 37 constitutes a bipolar electrode, and in practice a plurality of such bipolar electrodes will be arranged one above the other at a distance. Inside each individual cell an electrically nonconducting supporting framework 30 may be arranged, which is, however, not absolutely necessary. The column 35 is filled with electrolyte up to the liquid level 40, which electrolyte is supplied from above through line 41. Fresh ammonium sulfide solution comes from line 42. The electrolyte moves downwards in column 35 through the packing layers and the cells, whereas $O_2$-containing gas, supplied in line 43 and coming from the distributor 44, countercurrently flows upwards through the electrolyte. In the process, APS is formed, which is withdrawn as a solution via line 45; a partial stream of this solution is recirculated through line 46. Gases produced are withdrawn through the outlet 47, and for safety reasons an inert purge gas (e.g. $N_2$) is introduced through line 48 into the gas collecting chamber 49, so as to counteract the risk of explosion. The pressure in column 35 may be in the range from 1 to 60 bar. Said column is particularly suited for being operated at a high pressure.

EXAMPLE 1

In the laboratory, an arrangement as shown in FIG. 1 is used, where the electrodes each have outside dimensions of 10×10 cm. The gas diffusion cathode K consists of an expanded metal grid made of nickel-containing steel (Hastelloy) and a carbon fabric with a thickness of 0.2 mm. The fabric (manufacturer: ZOLTEK, USA) is coated with soot and PTFE particles. A supporting plate of perforated polyvinyl chloride has been pressed through a frame gasket onto the fabric. As a result of its holes, the supporting plate produces a free area of 70 cm$^2$ on the cathode. A smooth metal plate of high-nickel steel serves as anode A. The distance between the supporting plate and the anode is 3 mm. Technically pure oxygen is supplied to the gas distribution chamber 6, and an excess pressure of 600 mm water column is maintained. Part of the gas bubbles through the carbon fabric into the electrolyte chamber 5.

Aqueous solution with an $(NH_4)_2S$-content of 50 g/l and a temperature of 40° C. are supplied to the cell via line 8 in an amount of 50 l/h. With a cell voltage of 0.3V there flows a current of 3.5A, so that the current density is 350 A/m$^2$. Sulfide is reacted in an amount of 6.8 g/h, of which 93% are determined to be APS by means of a sulfur analysis. In a comparative experiment with the power source switched off it is noted that 0.5 g/h sulfide is reacted. Thus, upon deduction of the part that undergoes a currentless oxidation, sulfide is reacted in an amount of 6.3 g/h under electrolysis conditions.

The amount of 6.3 g/h sulfide is produced by one or several of the process types A, B and C. To find this out, a parallel experiment is carried out with a membrane cell, where the cathode chamber is separated from the anode chamber by an ion exchange membrane (cf. DE-C-43 06 445) and the same $(NH_4)_2S$-solution is passed through the anode chamber. In the process, with a current of 3.5 A per hour 2.1 g sulfide are reacted to form APS with a yield of 93%. This sulfide reaction exclusively takes place on the anode according to process way A in a purely electrochemical manner. It has thus been clarified that the difference of (6.3–2.1) g/h =4.2 g/h sulfide has been produced by means of process ways B and C.

Proportion of the sulfide quantity reacted by process way B: From further parallel experiments with a two-chamber membrane cell comprising a gas diffusion cathode and with the supply of technically pure $O_2$ it is known that hydroperoxide anions (OOH') are formed by means of the reaction

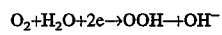

with a yield of 80%, with reference to the amount of current flown. Again, the OOH$^-$ ions are completely reacted with sulfide ions according to the reaction

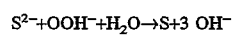

For the sulfide reaction according to process way B there is thus achieved a yield of (2.1·0.8) g/h=1.7 g/h. sulfide. In the laboratory experiment with the arrangement shown in FIG. 1, 1.7 g/h sulfide are thus reacted at the gas diffusion cathode with a current flow of 3.5A. The laboratory experiment has had the result indicated in column I of the following Table:

TABLE

|  | I | II |
|---|---|---|
| Sulfide reaction way A: | 2.1 g/h | 0.3 g/h |
| Sulfide reaction way B: | 1.7 g/h | 0.24 g/h |
| Sulfide reaction way C: | 2.5 g/h | 3.14 g/h |
| Sulfide reaction with non-activated oxygen: | 0.5 g/h | 0.5 g/h |
| Total sulfide reaction: | 6.8 g/h | 4.18 g/h |

EXAMPLE 2

In a second laboratory experiment with the arrangement as in Example 1, but with a current flow of 0.5A and a cell voltage of 0.02V, sulfide reactions are obtained as they are indicated in column II of the above Table.

In the known process in accordance with DE-C-43 06 445 sulfide reactions are achieved only by process type A and by means of non-activated oxygen; the reaction by process types B and C is not known from DE-C-43 06 445. For the above Table this means that in column I only the reaction of (2.1+0.5) g/h=2.6 g/h sulfide is produced in the known manner, and that (1.7+2.5) g/h=4.2 g/h sulfide are produced in addition in a novel manner. In accordance with column II, at a surprisingly low current, 0.8 g/h sulfide are produced in the known manner, and in addition 3.38 g/h sulfide are produced in the novel manner.

We claim:

1. A process of producing ammonium polysulfide (APS) in at least one electrochemical cell, said electrochemical cell comprising:
   (a) an anode;
   (b) a gas diffusion cathode comprising an electrically conductive, gas-permeable carbon layer; and
   (c) an electrolyte chamber between said anode and said gas diffusion cathode;
   wherein:
   said anode and said cathode are directly or indirectly connected to a source of direct electric current outside of said electrochemical cell so that a cell voltage of 0.01 to 5V results within said electrochemical cell;
   said electrolyte chamber is supplied with an electrolyte comprising an aqueous ammonium sulfide solution;
   a gas containing free oxygen and said electrolyte are able to flow between said anode and said cathode; and
   said anode and said cathode are in contact with said electrolyte;
   said process comprising:
   (i) feeding a gas containing free oxygen over said carbon layer into the electrolyte chamber and into contact with said anode;
   (ii) forming hydroperoxide anions (OOH$^-$) and APS in said electrolyte chamber; and
   (iii) withdrawing from said electrolyte chamber a solution comprising APS and a residual gas;
   wherein at least 10 percent by weight of the APS which is formed is generated by the gaseous free oxygen which is introduced into the electrolyte chamber.

2. The process as claimed in claim 1, characterized in that at least 10 wt-% of the APS formed are generated by the formation of hydroperoxide anions and their reaction with sulfide ions.

3. The process as claimed in claim 1, characterized in that the carbon layer is constituted by carbon fibers.

4. The process as claimed in claim 1, characterized in that the carbon layer is constituted by granules made of carbon.

5. The process as claimed in claim 1, characterized in that the carbon layer is constituted by packing elements.

6. The process as claimed in one of claims 1 characterized in that a plurality of cells are connected with each other, where the cathodes and the anodes are electrically connected in parallel.

7. The process as claimed in one of claims 1 characterized in that a plurality of cells are connected with each other, where the cathodes and the anodes are electrically connected in series.

* * * * *

UNITED STATES PATENT AND TRADEMARK OFFICE
CERTIFICATE OF CORRECTION

PATENT NO. : 5,637,206
DATED : June 10, 1997
INVENTOR(S) : Anastasijevic, et al.

It is certified that error appears in the above-indentified patent and that said Letters Patent is hereby corrected as shown below:

Col. 8, claim 6 line 1  Delete " one of claims " and substitute -- claim --

Col. 8, claim 7 line 1  Delete " one of claims " and substitute -- claim --

Signed and Sealed this

Fifteenth Day of December, 1998

Attest:

BRUCE LEHMAN

*Attesting Officer*   *Commissioner of Patents and Trademarks*